United States Patent
Mari Curbelo et al.

(10) Patent No.: US 9,024,551 B2
(45) Date of Patent: May 5, 2015

(54) BRAKING AND AUXILIARY POWER CONVERTER

(71) Applicant: General Electric Company, Schenectady, NY (US)

(72) Inventors: Alvaro Jorge Mari Curbelo, Bayern (DE); Henry Todd Young, Erie, PA (US); Jason Daniel Kuttenkuler, Erie, PA (US)

(73) Assignee: General Electric Company, Schenectady, NY (US)

( * ) Notice: Subject to any disclaimer, the term of this patent is extended or adjusted under 35 U.S.C. 154(b) by 207 days.

(21) Appl. No.: 13/731,141

(22) Filed: Dec. 31, 2012

(65) Prior Publication Data

US 2014/0184113 A1 Jul. 3, 2014

(51) Int. Cl.
*H02P 3/12* (2006.01)
*H02P 3/22* (2006.01)
*B60L 7/22* (2006.01)
*B60L 7/00* (2006.01)

(52) U.S. Cl.
CPC .... *H02P 3/12* (2013.01); *B60L 7/00* (2013.01)

(58) Field of Classification Search
CPC ............... H02P 3/12; H02P 3/22; B60L 7/22; B60L 7/00

USPC ......... 318/380, 370, 371, 374, 375; 180/65.1, 180/65.21, 65.51

See application file for complete search history.

(56) References Cited

U.S. PATENT DOCUMENTS

| | | | | |
|---|---|---|---|---|
| 5,319,292 A * | 6/1994 | Backstrand | .................... | 318/371 |
| 6,486,568 B1 * | 11/2002 | King et al. | ....................... | 307/66 |
| 7,119,437 B2 * | 10/2006 | Morita et al. | .................. | 257/724 |
| 8,025,115 B2 * | 9/2011 | King et al. | ................ | 180/65.275 |
| 8,427,086 B2 * | 4/2013 | Vilar | .............................. | 318/380 |
| 2005/0285554 A1 * | 12/2005 | King et al. | ..................... | 318/376 |

* cited by examiner

*Primary Examiner* — Rita Leykin
(74) *Attorney, Agent, or Firm* — GE Global Patent Operation; John A. Kramer

(57) ABSTRACT

An integrated power converter includes first and second auxiliary switch modules, and one or more braking switch modules. The first auxiliary switch module is mounted at a first location of a laminated bus bar, and connects a first auxiliary lead with a first power layer and a second power layer of the bus bar. The second auxiliary switch module is mounted at a second location of the bus bar, and connects a second auxiliary lead with the first and second power layers. The braking switch modules are mounted at additional locations of the bus bar, adjacent to the first and second locations. Each braking switch module connects a braking lead with one of the power layers of the bus bar, and with a dual diode module or with the other power layer of the bus bar.

23 Claims, 5 Drawing Sheets

BRAKING AND AUXILIARY POWER CONVERTER

BACKGROUND

1. Technical Field

Embodiments of the invention relate generally to power converters. Other embodiments relate to braking power converters for use with electric wheel brakes usable in off-highway vehicles ("OHVs"), such as mining trucks, locomotives, and the like, and other vehicles.

2. Discussion of Art

Power supplies are electronic/electrical circuits that supply electric power to one or more electric loads. The term "power supply" is most commonly applied to collections or an assembly of electrical devices that convert one form of electrical energy to another, which are commonly referred to as "power converters." Many power supplies include two or more power converters connected together. Typically, power converters are "switching" power converters, in which multiple solid state devices are to used to intermittently interrupt an input current so as to effectuate conversion of the input current to an output current having different amplitude, voltage, and/or frequency. For example, a "DC power converter" produces output power at a substantially constant output voltage and/or current.

Conventional power converters, generally, are groupings of plural solid state switches that are connected to output terminals from a first DC input terminal or from a second DC input terminal. The two DC terminals typically are known jointly as a "DC link," while the term "DC link voltage" often is used to refer to a potential difference across this DC link.

Typically, power converters are designed to drive specific loads (e.g., motors or actuators). However, power converters also can be designed to be driven by specific sources. For example, a braking power converter can be driven by voltage generated at an electric wheel during braking. The generated voltage and/or frequency will vary depending on the rotational speed of the wheel being braked. A braking power converter can be modulated to permit or prevent current from the electric wheel brake to a resistive load, thereby modulating the braking power of the electric wheel brake. However, each of the power converter switch modules has a maximum current that limits the achievable braking power. The maximum current limit is determined, in part, by the available forward conducting area within the switch module.

BRIEF DESCRIPTION

In view of the above, it is desirable to provide a braking power converter that can permit current during a greater fraction of its operating cycle, relative to known braking power converters.

In embodiments, an integrated power converter is provided that includes first and second auxiliary switch modules of an auxiliary power converter, and one or more braking switch modules of a braking power converter. An auxiliary power converter is a converter dedicated to modulated current from one or more braking motors to one or more auxiliary (non-traction) loads or secondary energy storage. A braking power converter is a power converter dedicated to switching electrical current from one or more braking motors to a dissipator (resistor bank/heat sink). An integrated power converter is one in which the auxiliary power converter and the braking power converter are mounted to a same bus bar. The first auxiliary switch module is mounted at a first location of the bus bar, and connects a first auxiliary lead with a first power layer and a second power layer of the bus bar. The second auxiliary switch module is mounted at a second location of the bus bar, and connects a second auxiliary lead with the first power layer and the second power layer of the bus bar. The braking switch modules are mounted at additional locations of the bus bar, adjacent to the first and second locations. Each braking switch module connects a braking lead with one of the first power layer or the second power layer of the bus bar, and with a dual diode module or with the other of the first power layer or the second power layer of the bus bar.

In embodiments, a vehicle is provided. The vehicle comprises a braking motor, a dissipator, an auxiliary electrical load, an input device, and a power converter. The power converter is connected between the braking motor and the dissipator for modulating current from the braking motor to the dissipator in response to actuation of the input device, and is connected between the braking motor and the auxiliary electrical load for modulating current from the braking motor to the auxiliary electrical load.

In embodiments, a method is provided for power conversion. The method comprises switching one or more braking switch modules of an integrated power converter to energize a dissipator from a power source, and switching one or more auxiliary switch modules of the integrated power converter to energize one or more auxiliary loads from the power source.

In embodiments, an integrated power converter comprises a bus bar, plural braking switch modules connected to the bus bar and configured for coupling with a dissipator and a power source, plural auxiliary switch modules connected to the bus bar and configured for coupling with one or more auxiliary loads and the power source, and a control module. The control module is configured to controllably switch the one or more braking switch modules to energize the dissipator from the power source and to controllably switch the one or more auxiliary switch modules to energize the one or more auxiliary loads from the power source.

In embodiments, a vehicle comprises a dissipator, a power source, an auxiliary electrical load, a bus bar, plural braking switch modules connected to the bus bar for connecting the dissipator with the power source, plural auxiliary switch modules connected to the bus bar for coupling the auxiliary electrical load with the power source, and a control module. The control module is configured to controllably switch the one or more braking switch modules to energize the dissipator from the power source and to controllably switch the one or more auxiliary switch modules to energize the one or more auxiliary loads from the power source.

DRAWINGS

The present invention will be better understood from reading the following description of non-limiting embodiments, with reference to the attached drawings, wherein below:

DETAILED DESCRIPTION

Figure 1:
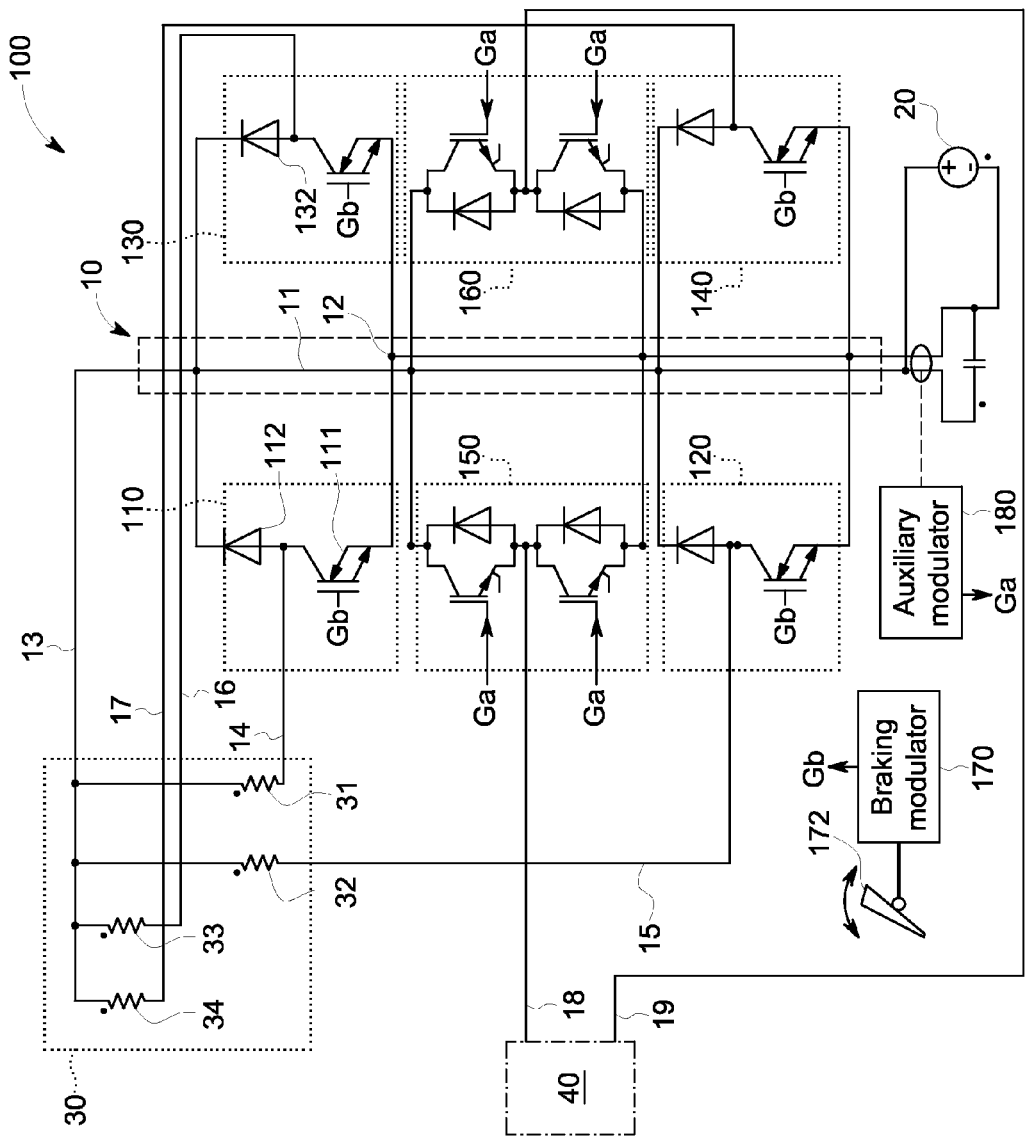
FIG. 1 illustrates in electronic schematic view a power converter comprising reverse conducting semiconductor (RCS) chopper modules, according to a first embodiment of the present invention.

Reference will be made below in detail to exemplary embodiments of the invention, examples of which are illustrated in the accompanying drawings. Wherever possible, the same reference characters used throughout the drawings refer to the same or like parts, without duplicative description.

Aspects of the invention relate to conversion of "waste" current, generated by electric braking, for dissipation by one or more resistor banks and for use by auxiliary loads.

As used herein, the terms "substantially," "generally," and "about" indicate conditions within reasonably achievable manufacturing and assembly tolerances, relative to ideal desired conditions suitable for achieving the functional purpose of a component or assembly.

Aspects of the invention relate to integrated power converters, for use in vehicles or otherwise. As noted above, an integrated power converter is one in which an auxiliary power converter and a braking power converter are mounted to a same bus bar. For example, in one embodiment, an integrated power converter comprises a bus bar, a first auxiliary switch module, a second auxiliary switch module, and one or more braking switch modules. The bus bar includes a first power layer and a second power layer, e.g., the bus bar may be a laminated bus bar. The first auxiliary switch module is mounted at a first location of the bus bar, and connects a first auxiliary lead with the first power layer and the second power layer of the bus bar. The second auxiliary switch module is mounted at a second location of the bus bar, and connects a second auxiliary lead with the first power layer and the second power layer of the bus bar. The one or more braking switch modules are mounted at additional locations of the bus bar, adjacent to the first and second locations. Each braking switch module connects a braking lead with one of the first power layer or the second power layer of the bus bar, and with a dual diode module or with the other of the first power layer or the second power layer of the bus bar.

Figure 2:
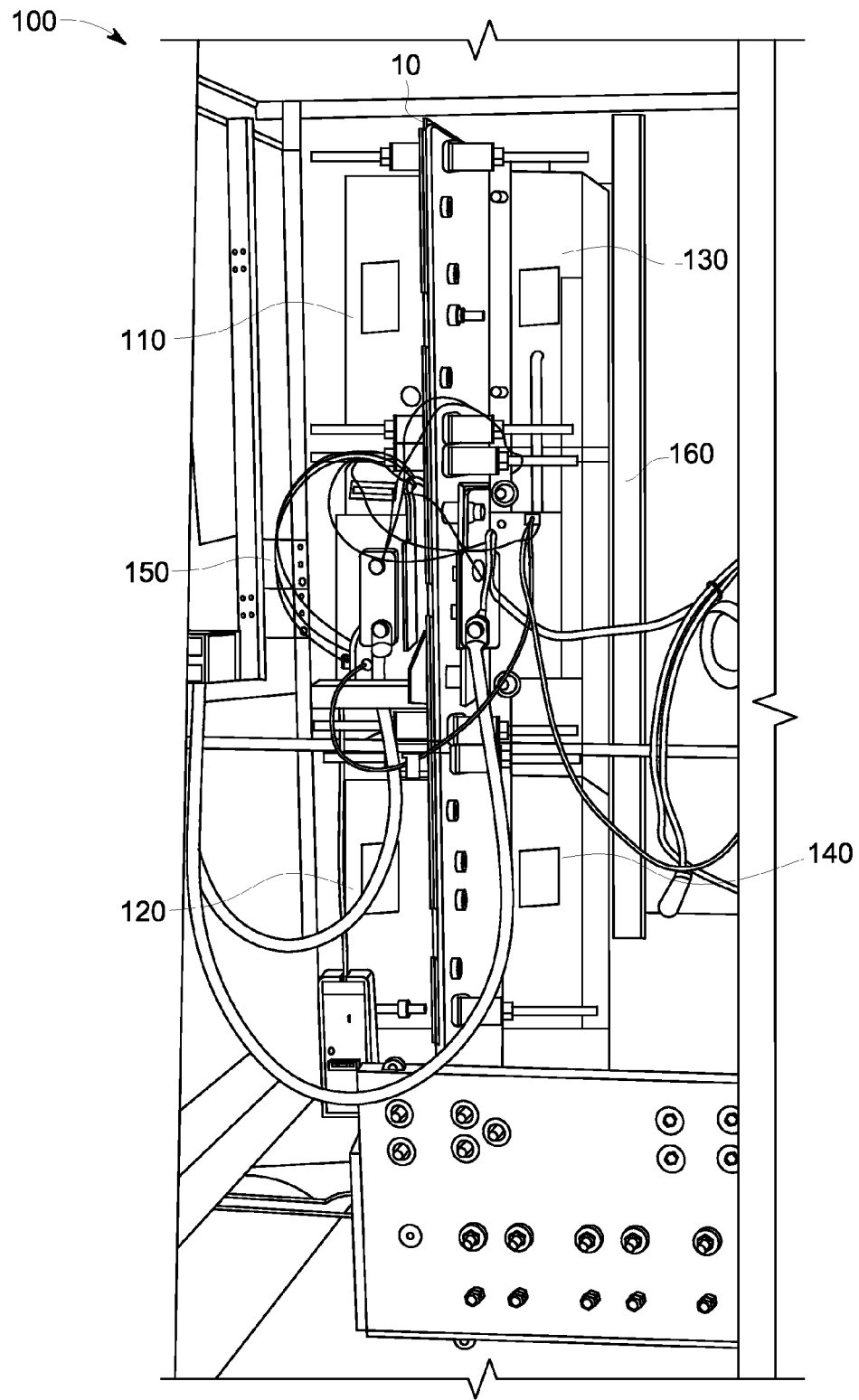
FIG. 2 illustrates in perspective view the power converter shown in FIG. 1.

FIGS. 1-5 illustrate other embodiments and aspects of the invention. For example, in an embodiment as shown in FIGS. 1 and 2, an integrated braking and auxiliary power converter 100 is built around a laminated bus bar 10. In particular, components of the power converter 100 are mounted onto the laminated bus bar 10.

The laminated bus bar 10 includes a first conductive layer 11, as well as a second conductive layer 12, which are separated by a resistive layer (not shown). Collectively, the conductive layers 11 and 12 are referred to as "power layers." The power layers 11, 12 are disposed in close proximity at opposing surfaces of the resistive layer. Generally, the power layers 11, 12, and any other conductive layers of the bus bar that are separated in close proximity by only a single resistive layer, may be referred to as "adjacent;" however, this particular meaning for "adjacent" is to be understood only in context of the bus bar conductive layers. The power layers 11, 12 are relatively thin layers having relatively high conductance (e.g., in certain embodiments, less than 3 mm thick; less than 2E-8 ohm-m resistivity). For example, the first and second power layers 11, 12 can be composed of copper, aluminum, or similar highly conductive metals. The resistive layer is a relatively thin layer having relatively high dielectric strength (e.g., in certain embodiments, less than 2 mm thick; more than 30 kV/m). For example, the resistive layer can be composed of PET, PTFE (e.g., Teflon brand), melamine resin, or similar highly resistive polymers. Because the power layers are thin, relatively close together, and conduct current in generally opposite directions at any point across the laminated bus bar 10, the magnetic energy stored by the laminated bus bar 10 approaches zero in direct current applications, even during switching of current. Thus, the laminated bus bar 10 presents low inductance within the braking and auxiliary power converter 100.

The first and second power layers 11, 12 are connected to receive electrical current from one or more electric "braking motors" (generators) shown generally as a DC power source 20. Specifically, the first power layer 11 is a high potential power layer that is connected to a positive terminal(s) of the DC power source 20, while the second power layer 12 is a low potential power layer (at a voltage lower than that of the first layer 11, and possibly lower than earth ground) that is connected to a negative terminal(s) of the DC power source 20. Typically, the received electrical power is direct current (DC) power, however, in some embodiments, the received electrical power can be alternating current (AC). The bus bar 10 may be connected for an earth ground on the low potential power layer 12, or for a floating ground.

The high potential conductive layer 11 (the first power layer) is connected by a lead 13 to a "dissipator" 30, which may comprise plural resistors 31, 32, 33, 34 of a resistor bank. The resistors 31, 32, 33, 34 respectively are connected back to the lower potential conductive layer 12 via braking leads 14, 15, 16, 17 and via braking switch modules 110, 120, 130, 140 of the power converter 100. In exemplary embodiments, each of the resistors 31, 32, 33, 34 is a sturdy finned heat sink composed of steel, aluminum, or similar material that is highly conductive both electrically and thermally. In other embodiments, the resistors are arranged as a resistor grid for dissipating power as thermal energy; the thermal energy may be dissipated by a controlled blower that blows cooling air through the grid.

The braking switch modules 110, 120, 130, 140 connect the resistors 31, 32, 33, 34 across the power layers 11, 12 for the purpose of establishing significant current flow and braking torque at the braking motors of the DC power source 20. The braking switch modules 110, 120, 130, 140 are configured to receive gate signals "Gb" that are triggered by a braking modulator 170. By default, the braking modulator 170 does not provide the braking gate signals Gb. When the braking switch modules 110, 120, 130, 140 do not receive the braking gate signals Gb, they are switched OFF and do not conduct current through the resistors 31, 32, 33, 34, thus, they do not permit current through the braking motors 20 to induce a braking torque. The braking modulator 170 is configured to provide the braking gate signals Gb, responsive to operation of an input device 172 (e.g., a braking foot pedal). For example, the input device 172 may be movable between a neutral (non-braking) position and any of a range of braking positions, which may include one or more "light braking" positions and one or more "heavy braking" positions. By adjusting the periodicity at which the braking gate signals Gb are triggered, the braking modulator 170 can modulate current from the DC power source 20 through the resistor bank 30, thereby modulating electrical load and braking torque on the electric braking motors. When the input device 172 is actuated to a "heavy braking" position (which may be one of a range of positions), then the braking modulator 170 is activated to provide the braking gate signals Gb. The braking switch modules 110, 120, 130, 140 are switched ON by receipt of the braking gate signals Gb, current flows between the power layers 11, 12 via the resistors 31, 32, 33, 34, thereby putting a relatively large electrical load on the braking motors 20 and inducing a braking torque that causes the OHV to slow ("heavy braking"). In certain embodiments, the braking gate signals Gb can be modulated, such that each of the resistors 31, 32, 33, 34 is intermittently energized to mitigate resistive heating of the individual resistors while continuously conducting current through the dissipator 30. By intermittently, is meant that each of the braking switch modules 110, 120, 130, 140 is switched OFF for at least a portion of the time during which the input device 172 is actuated. In certain embodiments, the braking gate signals Gb can be modulated, such that each of the braking switch modules is switched ON for a relatively greater portion of the time during which the input device 172 is actuated, according to an amount (e.g., a distance from its neutral position) by which the input device 172 is actuated.

In embodiments according to FIG. 1, the braking switch modules 110, 120, 130, 140 are configured as reverse-conducting semiconductor (RCS) chopper modules that include reverse-conducting semiconductor (RCS) switches 111, 121, 131, 141 in series with chopper diodes 112, 122, 132, 142. Each RCS switch is shown by a single schematic symbol, however, in practicality is comprised of multiple RCS chips bonded together. An exemplary RCS chip is the RC-IGBT or BIGT chip produced by ABB Ltd company.

The RCS switches 111, 121, 131, 141 are connected to receive braking gate signals Gb triggered by the braking modulator 170. Advantageously, the RCS switches 111, 121, 131, 141 provide relatively high current throughput in a relatively compact footprint. In particular, because each RCS switch integrates the reverse-conducting functionality of a freewheel diode, each RCS switch can be allocated a physical footprint that would otherwise be apportioned among a conventional switch and its associated freewheel diode. Thus, each of the RCS switches can conduct higher current than could be achieved by a switch-and-diode package of comparable size.

Meanwhile, auxiliary switch modules 150, 160 are configured to connect the power layers 11, 12 with auxiliary loads 40 of the OHV (e.g., motors of hydraulic or pneumatic pumps or compressors, communications equipment, fans or compressors for climate control, lighting systems) via A and B phase auxiliary leads 18, 19. Each of the auxiliary switch modules 150, 160 is connected to receive auxiliary gate signals Ga triggered by an auxiliary modulator 180. The auxiliary modulator 180 is configured to sense varying voltage and frequency supplied from the generators (braking motors) of the DC power source 20, and is configured to adjust the auxiliary gate signals Ga based on the sensed voltage and frequency so that the auxiliary switch modules 150, 160 can deliver substantially smooth current and voltage waveforms to the auxiliary loads 40. In this context "substantially smooth" means adhering to a determinate waveform within manufacturer-specified tolerances of the auxiliary loads 40.

While the braking modulator 170 and the auxiliary modulator 180 have been described as separate components of the integrated power converter 100, these two components may be described generally as a "control module," and the functionality of such a control module may be implemented in a single device, according to embodiments of the present invention.

With respect to the laminated bus bar 10, the auxiliary switch modules 150, 160 are arranged at first and second positions at either side of the bus bar. The braking switch modules 110, 120 are arranged in a first group at third and fourth positions bracketing the first position, while the braking switch modules 130, 140 are arranged in a second group at fifth and sixth positions bracketing the second position. Thus, the switch modules 110, 120, 130, 140, 150, 160 are mechanically, electrically, and thermally balanced across the laminated bus bar 10.

In embodiments according to FIG. 1, each auxiliary switch module 150 or 160 includes a first IGBT switch 151 or 161 and a second IGBT switch 152 or 162. Thus, the auxiliary switch modules 150, 160 are "dual IGBT" modules. The IGBT switches 151, 152, 161, 162 are configured to be switched on or off by auxiliary gate signals Ga from the auxiliary modulator 180. Switching of the IGBT switches 151, 152, 161, 162 commutates the power layers 11, 12 with the output leads 18, 19, thereby providing direct or alternating current to the auxiliary load(s) 40. Each auxiliary switch module 150 or 160 also includes a first anti-parallel diode 153 or 163 that is connected with the first IGBT switch 151 or 161, and a second anti-parallel diode 154 or 164 that is connected with the first IGBT switch 152 or 162. By "anti-parallel" it is meant that each switch-diode pair is connected anode-to-emitter and cathode-to-collector, such that when one of the switches is reverse-biased the corresponding anti-parallel diode will "freewheel" (conduct current around) the switch. (As noted above, the RCS switches of the braking switch modules 110, 120, 130, 140 incorporate this freewheel functionality into the switch, such that reverse current can be conducted through, rather than around, the RCS switches.) Thus, the auxiliary switch modules 150, 160 are configured to mitigate voltage spikes due to commutation of the auxiliary loads 40.

In case the auxiliary switch modules 150, 160 are switched to provide power to the auxiliary load(s) 40 from the DC power source 20, then the auxiliary load(s) put a relatively small electrical load on the braking motors of the DC power source 20 ("light braking"). In some embodiments, light braking may be substantially continuous, that is, the braking motors 20 may be integral to the auxiliary power supply system and the auxiliary switch modules 150, 160 may be switched continuously to produce a continual supply of electrical power to the auxiliary electrical loads 40. It should be noted that extended light braking, using electric braking motors, does not produce a problem of reduced braking power as known from friction brakes. Alternatively, the auxiliary loads 50 may typically be powered from a vehicle power storage system (not shown) or from an auxiliary generator such as an engine-driven alternator (not shown), with the auxiliary switch modules 150, 160 supplementing the typical power supply only intermittently when light braking is requested by movement of the input device 172.

In certain embodiments, the power converter 100 with RCS chopper braking switch modules 110, 120, 130, 140 and auxiliary switch modules 150, 160 attains total braking power dissipation approximately 1.5 times what is attainable by a power converter using four conventional IGBT chopper braking switch modules of the same footprint (e.g., 19 cm×14 cm) placed in positions 110, 120, 130 and 140. This can be attained because the RCS switches do not require the anti-parallel diode associated with IGBT switches, thus, can have a larger forward-conducting area on the same footprint.

In exemplary embodiments, wherein the braking motors of the DC power source 20 are mounted on wheels of a very large (360 ton) off-highway vehicle (OHV), then at a high speed (40 mph) of the OHV, the power dissipated to the resistor bank 30 through the braking switch modules 110, 120, 130, 140 may be about 4.5 MW at 1800 V. At lower speeds of the OHV, the DC power source 20 is at significantly lower voltage, e.g., about 1200 V.

Referring to FIG. 2, the braking switch modules 110, 120, 130, 140 and the auxiliary switch modules 150, 160 all are housed in a common cabinet with the laminated bus bar 10. Conventionally, separate cabinets have been provided for braking power conversion (often integrated with the motor converter) and for auxiliary power conversion.

Figure 3:
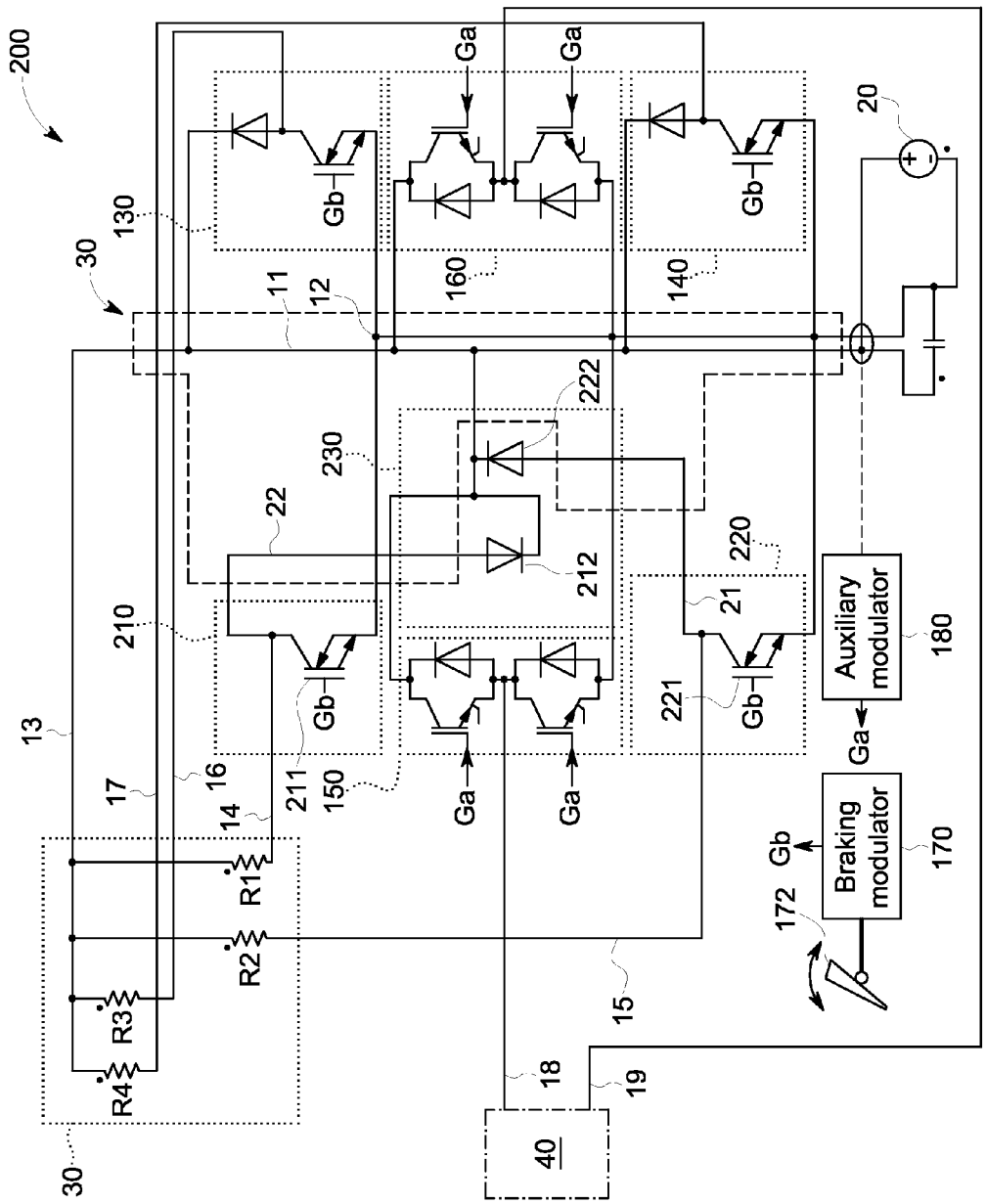
FIG. 3 illustrates in electronic schematic view a power converter comprising reverse conducting semiconductor (RCS) single switch modules and a dual diode freewheel module, according to a second embodiment of the present invention.

Referring to FIG. 3, further improvements in braking switch module duty cycles and in braking power can be attained using a power converter 200, in which at least some full-power RCS switch modules 210, 220 include only single RCS switches 211, 221 without chopper diodes. (While the term "single" is used to denote the absence of chopper diodes, each of the RCS switches 211, 221 nonetheless should be understood to typically comprise multiple chips bonded to provide an assembly that functions as a single switch.) Instead of chopper diodes, freewheel diodes 212, 222 are provided in a dual diode (freewheel) module 230. Each of the RCS switches 211, 221 is connected with a corresponding one of the freewheel diodes 212, 222 via a corresponding portion 21, 22 of a "freewheel layer" of a three-layer laminated bus bar 30. The freewheel layer portions 21, 22 are disposed adjacent the first power layer 11, separated only by a resistive layer (not shown).

In order to fit within the envelope of a conventional power converter cabinet, the dual diode module 230 is packaged at the same position along the laminated bus bar 30 as, and shares a common heat sink with, the auxiliary switch module 150. The combination of the dual diode module 230 and the auxiliary switch module 150, on a common heat sink, may be referred to as a "supermodule."

By providing the dual diode module 230, additional forward-conducting area is opened within the footprint of each RCS switch module 210, 220. In particular, each of the RCS switches 211, 221 may comprise additional chips, thus increasing achievable power throughput. As a result, the embodiment shown in FIG. 2 can achieve average braking power about 1.875 times what is achievable by IGBT chopper modules of comparable footprint placed in positions 210, 220, 130 and 140.

Figure 4:
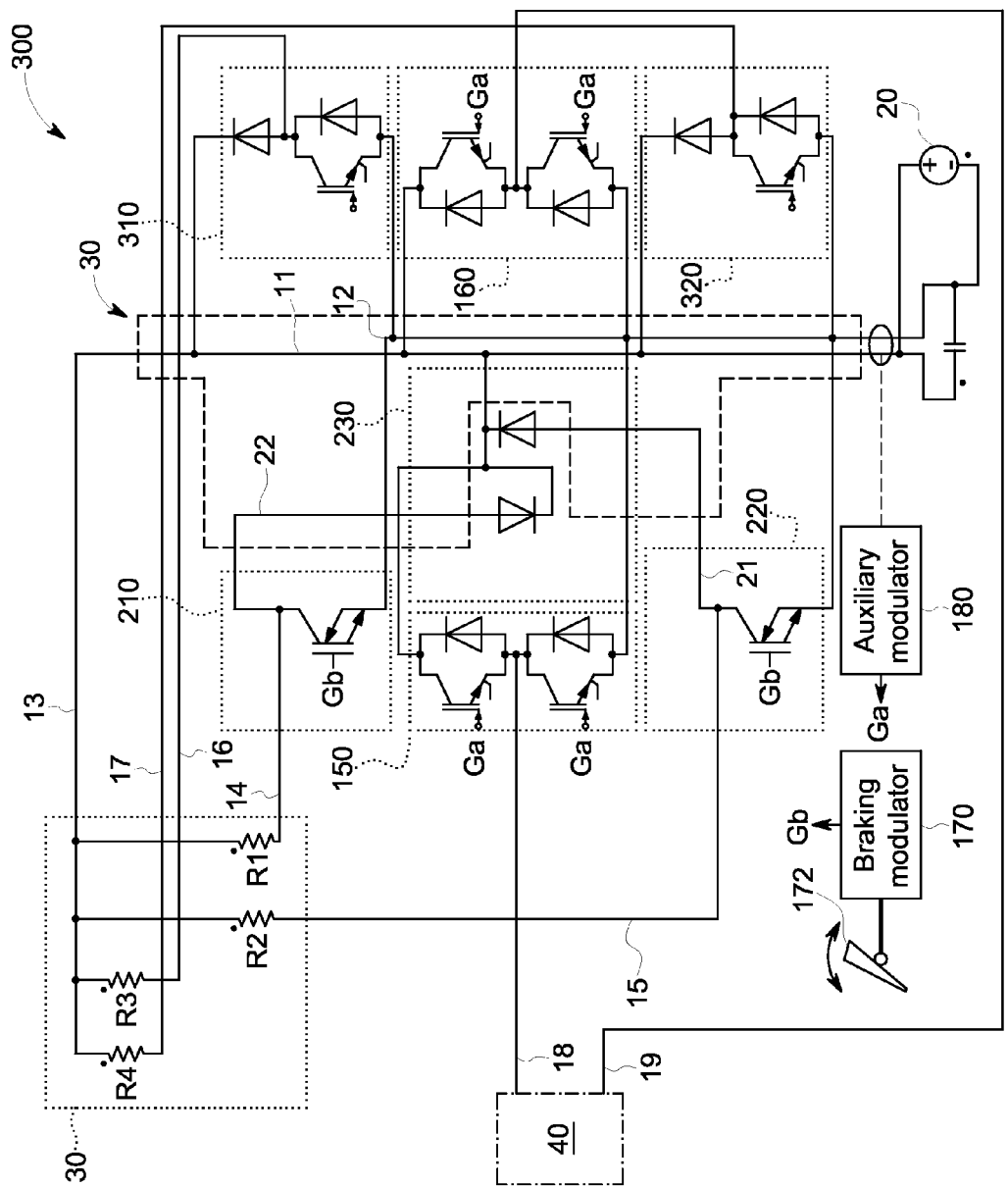
FIG. 4 illustrates in electronic schematic view a power converter comprising reverse conducting semiconductor (RCS) chopper modules, insulated gate bipolar transistor (IGBT) chopper modules, and a dual diode freewheel module, according to a third embodiment of the present invention.

FIG. 4 shows a third embodiment of the invention, in which a power converter 300 includes a combination of RCS switch modules 210, 220 with IGBT chopper modules 310, 320. Again, freewheel diodes 212, 222 are provided in the dual diode module 230 separate from the RCS switches 211, 221, thereby opening additional forward-conducting area on the switch module, and permitting braking power that is 1.625 times what is achievable by comparable IGBT chopper modules placed in positions 210, 220, 310 and 320.

Figure 5:
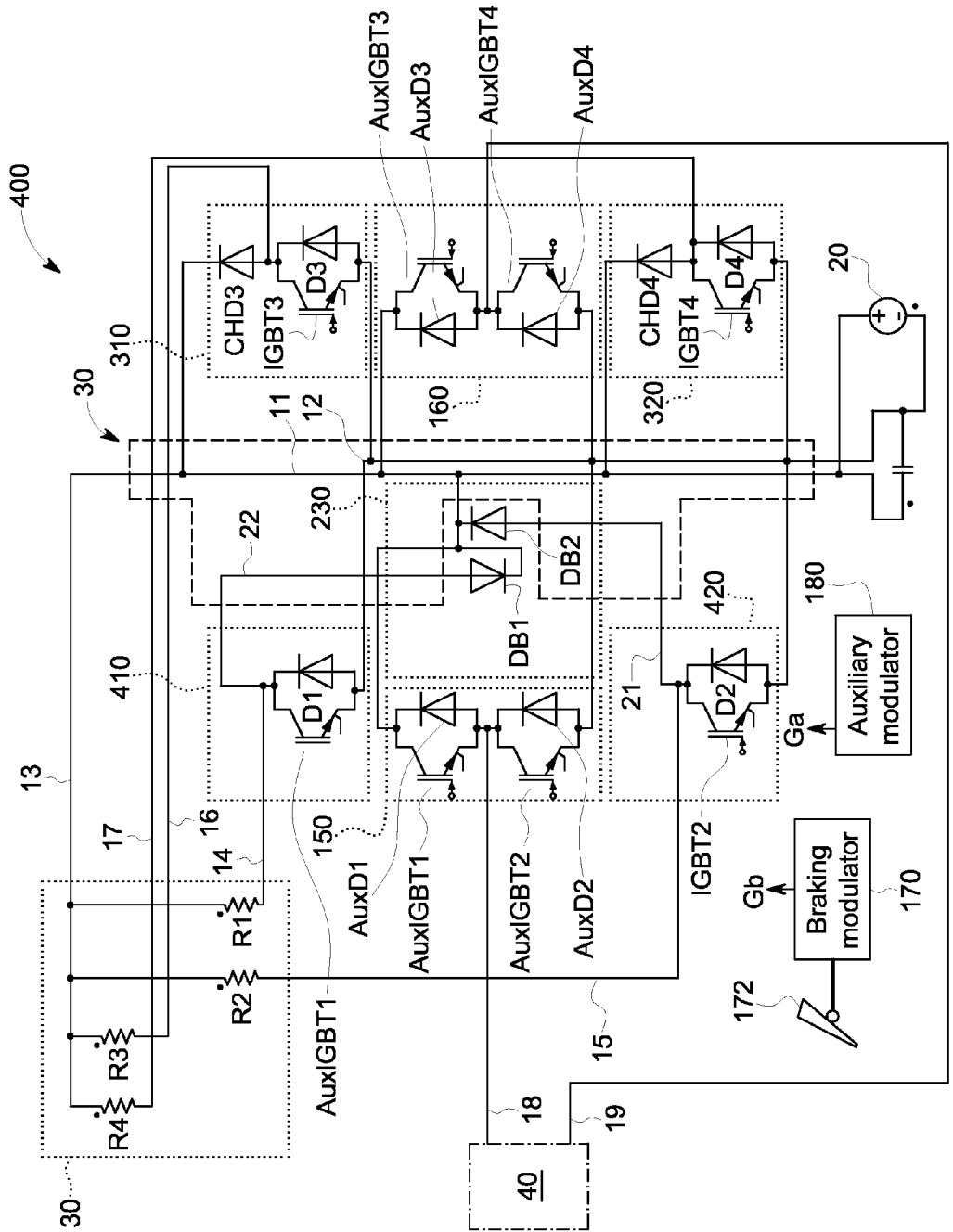
FIG. 5 illustrates in electronic schematic view a power converter comprising insulated gate bipolar transistor (IGBT) chopper modules and a dual diode freewheel module, according to a fourth embodiment of the present invention.

FIG. 5 shows a fourth embodiment, in which a power converter 400 includes two IGBT chopper modules 310, 320 and two IGBT switch modules 410, 420. The IGBT switch modules 410, 420 are connected with freewheel diodes 212, 222 of the dual diode module 230, such that the full conducting area of each IGBT switch module is forward-conducting area, thereby enabling a higher braking power (1.25 times what could be achieved for a design with four IGBT chopper modules placed in positions 410, 420, 310 and 320). This topology does not require RCS switches of any type.

Thus, in embodiments, an integrated power converter comprises a bus bar with a first power layer and a second power layer; a first auxiliary switch module mounted at a first location of the bus bar, and a second auxiliary switch module mounted at a second location of the bus bar. In certain embodiments, the bus bar may be a laminated bus bar. The first auxiliary switch module connect a first auxiliary lead with the first power layer and the second power layer of the bus bar. The second auxiliary switch module connects a second auxiliary lead with the first power layer and the second power layer of the bus bar. One or more braking switch modules are mounted at additional locations of the bus bar, adjacent to the first and second locations. Each braking switch module connects a braking lead with one of the first power layer or the second power layer of the bus bar, and with a dual diode module or with the other of the first power layer or the second power layer of the bus bar.

In certain embodiments, at least one of the one or more braking switch modules may be an RCS chopper module that includes an RCS switch connected between the braking lead and the second power layer of the bus bar, and a diode connected between the braking lead and the first power layer of the bus bar. In other embodiments, at least one of the one or more braking switch modules is an IGBT chopper module that includes an IGBT switch connected between the braking lead and the second power layer of the bus bar, a first diode connected anti-parallel to the IGBT switch, and a second diode connected between the braking lead and the first power layer of the bus bar. In other embodiments, at least one of the one or more braking switch modules is an RCS module that includes an RCS switch connected between the braking lead and the second power layer of the bus bar, and the power converter further comprises the dual diode module disposed adjacent to the auxiliary switch module at the first location, the dual diode module including a first diode connected between the RCS module and the first power layer of the bus bar. In yet other embodiments, the first diode of the dual diode module may be connected with the RCS module via a freewheel layer of the bus bar, the freewheel layer disposed adjacent to the first power layer of the bus bar. In other embodiments, at least one of the one or more braking switch modules is an IGBT module that includes an IGBT switch connected between the braking lead and the second power layer of the bus bar, and the power converter further comprises the dual diode module connected between the IGBT module and the first power layer of the bus bar, the dual diode module being disposed adjacent to the auxiliary switch module at the first location. The first diode of the dual diode module may be connected with the IGBT module via a freewheel layer of the bus bar, with the freewheel layer being disposed adjacent to the first layer of the bus bar. In certain embodiments, the one or more braking switch modules include a first group of first and second braking switch modules disposed at third and fourth positions that bracket the first position at one side of the bus bar, and a second group of third and fourth braking switch modules disposed at fifth and sixth positions that bracket the second position at the other side of the bus bar. Different types of braking switch modules and auxiliary switch modules may be combined in the same embodiment. For example, in some embodiments the braking switch modules may comprise RCS chopper modules, and the auxiliary switch modules may comprise dual IGBT modules. In other embodiments, the first group of braking switch modules may be single switch RCS modules. Alternatively, the first group of braking switch modules may be single IGBT modules. In other embodiments, the second group of braking switch modules may be chopper modules. For example, the second group of braking switch modules may be IGBT chopper modules. In embodiments, the first auxiliary switch module may be arranged on a common heat sink with the dual diode module. The dual diode module may be connected with the first group of braking switch modules via a freewheel layer of the bus bar that is adjacent to the first power layer.

In other embodiments, a vehicle comprises a braking motor; a dissipator; an auxiliary electrical load; an input device; and an integrated power converter. The integrated power converter is connected between the braking motor and the dissipator for modulating current from the braking motor to the dissipator in response to actuation of the input device. Also, the integrated power converter is connected between the braking motor and the auxiliary electrical load for modulating current from the braking motor to the auxiliary electrical load.

In some aspects of the invention, a method is provided for power conversion. The method comprises switching one or more braking switch modules of an integrated power converter to energize a dissipator from a power source, and switching one or more auxiliary switch modules of the integrated power converter to energize one or more auxiliary loads from the power source. In some aspects, the one or more braking switch modules are intermittently switched to mitigate heating of portions of the dissipator. Also, the auxiliary switching modules may be continuously switched to energize the auxiliary loads.

In embodiments, an integrated power converter comprises a bus bar; plural braking switch modules connected to the bus bar and configured for coupling with a dissipator and a power source; plural auxiliary switch modules connected to the bus bar and configured for coupling with one or more auxiliary loads and the power source; and a control module configured to controllably switch the one or more braking switch modules to energize the dissipator from the power source and to controllably switch the one or more auxiliary switch modules to energize the one or more auxiliary loads from the power source.

In embodiments, a vehicle comprises a dissipator; a power source; an auxiliary electrical load; a bus bar; plural braking switch modules connected to the bus bar for connecting the dissipator with the power source; plural auxiliary switch modules connected to the bus bar for coupling the auxiliary electrical load with the power source; and a control module configured to controllably switch the one or more braking switch modules to energize the dissipator from the power source and to controllably switch the one or more auxiliary switch modules to energize the one or more auxiliary loads from the power source.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice embodiments of the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal language of the claims.

As used herein, an element or step recited in the singular and proceeded with the word "a" or "an" should be understood as not excluding plural of the elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described braking and auxiliary power converter, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. An integrated power converter comprising:
   a bus bar with a first power layer and a second power layer;
   a first auxiliary switch module mounted at a first location of the bus bar, and connecting a first auxiliary lead with the first power layer and the second power layer of the bus bar;
   a second auxiliary switch module mounted at a second location of the bus bar, and connecting a second auxiliary lead with the first power layer and the second power layer of the bus bar; and
   one or more braking switch modules mounted at additional locations of the bus bar, adjacent to the first and second locations, each braking switch module connecting a braking lead with one of the first power layer or the second power layer of the bus bar, and with a dual diode module or with the other of the first power layer or the second power layer of the bus bar.

2. An integrated power converter as claimed in claim 1, wherein at least one of the one or more braking switch modules is an RCS chopper module that includes an RCS switch connected between the braking lead and the second power layer of the bus bar, and a diode connected between the braking lead and the first power layer of the bus bar.

3. An integrated power converter as claimed in claim 1, wherein at least one of the one or more braking switch modules is an IGBT chopper module that includes an IGBT switch connected between the braking lead and the second power layer of the bus bar, a first diode connected anti-parallel to the IGBT switch, and a second diode connected between the braking lead and the first power layer of the bus bar.

4. An integrated power converter as claimed in claim 1, wherein at least one of the one or more braking switch modules is an RCS module that includes an RCS switch connected between the braking lead and the second power layer of the bus bar, the power converter further comprising the dual diode module disposed adjacent to the auxiliary switch module at the first location, said dual diode module including a first diode connected between the RCS module and the first power layer of the bus bar.

5. An integrated power converter as claimed in claim 4, wherein the first diode of the dual diode module is connected with the RCS module via a freewheel layer of the bus bar, said freewheel layer disposed adjacent to the first power layer of the bus bar.

6. An integrated power converter as claimed in claim 1, wherein at least one of the one or more braking switch modules is an IGBT module that includes an IGBT switch connected between the braking lead and the second power layer of the bus bar, the power converter further comprising the dual diode module connected between the IGBT module and the first power layer of the bus bar, the dual diode module being disposed adjacent to the auxiliary switch module at the first location.

7. An integrated power converter as claimed in claim 6, wherein the first diode of the dual diode module is connected with the IGBT module via a freewheel layer of the bus bar, said freewheel layer disposed adjacent to the first layer of the bus bar.

8. An integrated power converter as claimed in claim 1, wherein the one or more braking switch modules include a first group of first and second braking switch modules disposed at third and fourth positions that bracket the first position at one side of the bus bar, and a second group of third and fourth braking switch modules disposed at fifth and sixth positions that bracket the second position at the other side of the bus bar.

9. An integrated power converter as claimed in claim 8, wherein the braking switch modules comprise RCS chopper modules, and the auxiliary switch modules comprise dual IGBT modules.

10. An integrated power converter as claimed in claim 8, wherein the first group of braking switch modules are single switch RCS modules.

11. An integrated power converter as claimed in claim 10, wherein the second group of braking switch modules are chopper modules.

12. An integrated power converter as claimed in claim 10, wherein the second group of braking switch modules are IGBT chopper modules.

13. An integrated power converter as claimed in claim 8, wherein the first auxiliary switch module is arranged on a common heat sink with the dual diode module.

14. An integrated power converter as claimed in claim 13, wherein the dual diode module is connected with the first group of braking switch modules via a freewheel layer of the bus bar that is adjacent to the first power layer.

15. An integrated power converter as claimed in claim 14, wherein the first group of braking switch modules are single IGBT modules.

16. An integrated power converter as claimed in claim 15, wherein the second group of braking switch modules are IGBT chopper modules.

17. An integrated power converter as claimed in claim 1, wherein the bus bar is a laminated bus bar.

18. A vehicle comprising:
a braking motor;
a dissipator;
an auxiliary electrical load;
an input device; and
an integrated power converter as claimed in claim 1, wherein:
the integrated power converter is connected between the braking motor and the dissipator for modulating current from the braking motor to the dissipator in response to actuation of the input device; and
the integrated power converter is connected between the braking motor and the auxiliary electrical load for modulating current from the braking motor to the auxiliary electrical load.

19. A method for power conversion, comprising:
mounting one or more auxiliary switch modules at a first location of a bus bar having a first power layer and a second power layer;
coupling an auxiliary load with a power source via the one or more auxiliary switch modules, each auxiliary switch module connecting the auxiliary load with the first power layer and the second power layer of the bus bar;
mounting one or more braking switch modules at an additional location of the bus bar, adjacent to the first location;
coupling a dissipator with the power source via the one or more braking switch modules, each braking switch module connecting the dissipator with one of the first power layer or the second power layer of the bus bar, and with a dual diode module or with the other of the first power layer or the second power layer of the bus bar;
switching one or more of the one or more braking switch modules to energize the dissipator from the power source; and
switching one or more of the one or more auxiliary switch modules to energize the auxiliary load from the power source.

20. A method as claimed in claim 19, wherein the one or more braking switch modules are intermittently switched to mitigate heating of portions of the dissipator.

21. A method as claimed in claim 19, wherein the auxiliary switching modules are continuously switched to energize the auxiliary loads.

22. An integrated power converter comprising:
a bus bar having a first power layer and a second power layer;
plural braking switch modules connected to the bus bar and connecting a dissipator with one of the first power layer or the second power layer of the bus bar, and with a dual diode module or with the other of the first power layer or the second power layer of the bus bar, each braking switch module further being configured for coupling with a power source;
plural auxiliary switch modules connected to the bus bar and connecting one or more auxiliary loads with the first power layer and the second power layer of the bus bar, the switch modules also being configured for coupling with the power source; and
a control module configured to controllably switch the one or more braking switch modules to energize the dissipator from the power source and to controllably switch the one or more auxiliary switch modules to energize the one or more auxiliary loads from the power source.

23. A vehicle comprising:
a dissipator;
a power source;
an auxiliary electrical load;
a bus bar having a first power layer and a second power layer;
plural braking switch modules connected to the bus bar, each braking switch module connecting the dissipator with one of the first power layer or the second power layer of the bus bar, and with a dual diode module or with the other of the first power layer or the second power layer of the bus bar to connect the dissipator to the power source;

plural auxiliary switch modules connected to the bus bar and connecting the auxiliary electrical load with the first power layer and the second power layer of the bus bar to couple the auxiliary electrical load with the power source; and a control module configured to controllably switch the one or more braking switch modules to energize the dissipator from the power source and to controllably switch the one or more auxiliary switch modules to energize the one or more auxiliary loads from the power source.

* * * * *